Jan. 2, 1962
R. HAYDOCK
3,015,124
CASTER SLEEVE
Filed May 7, 1958
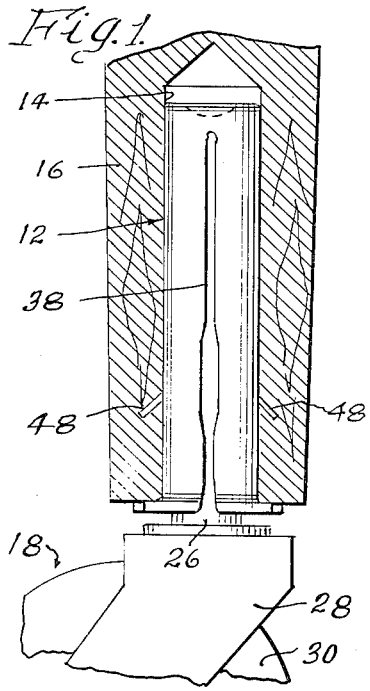
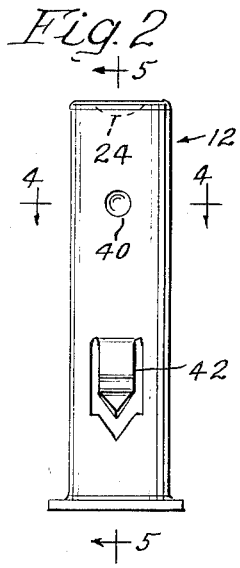
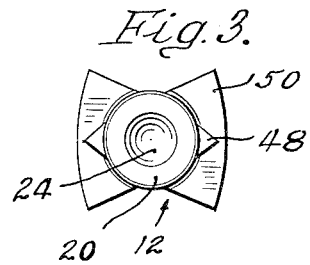
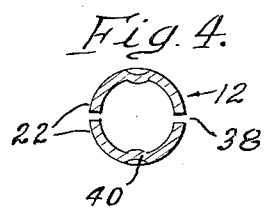
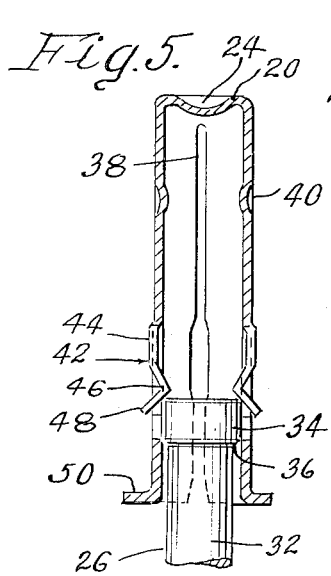
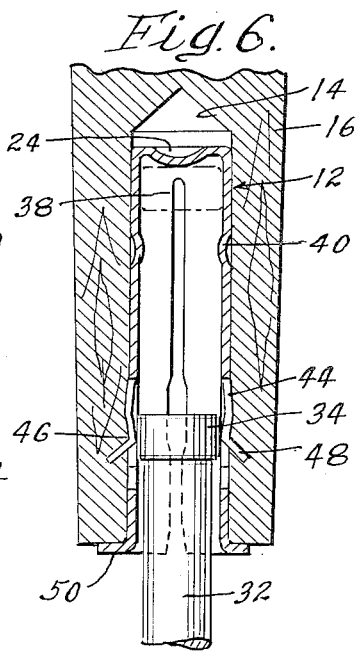
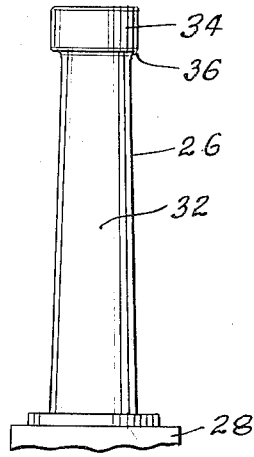
Inventor
Raymond Haydock
By Horton, Davis,
Brewer & Brugman Attys ically outwardly disposed, to a position in which the distance between the butt portions 46 is equal to the diameter of the head 34, which is of course slightly less than the diameter between the detents 40. Accordingly the head 34 passes beyond the butt portions 46 which snap back to their original position, so as to position the head of the pintle between the butt portions and the upper end of the sleeve.

The spreading action of the legs 22, as just referred to above, drives the pointed extremities 48 into the material of the furniture leg to a greater extent than that which may be produced by the sleeve contracting in the cavity upon being driven therein, and provides a very tight gripping action between the sleeve and the furniture leg, so as to retain the sleeve in the leg even upon repeated driving of the caster into the sleeve.

The sleeve is made of suitable material such as sheet metal of a character providing the resilience as indicated, such for example as suitable steel.

An important feature of the invention is the support of the weight of the furniture leg on the caster pintle at a single pivot point. The entire weight of the furniture leg is transmitted through the upper end 20 of the sleeve to the rounded projection 24 at the upper end of the pintle 26, and from there through the yoke 28 and wheel 30 to the floor. The support of the furniture leg at this single pivot point facilitates any slight rocking of the furniture leg due to the legs possibly being of slightly different lengths, and also compensates for any irregularities in the floor, such as rising and falling, in minor degree. The caster maintains a normal attitude, for efficient rolling and moving the furniture article in which it is incorporated.

Attention is called to the fact that the sleeve 12 is made of an integral piece, of simple construction, and being made of sheet metal, provides a sleeve of extreme simplicity and inexpensive to manufacture.

I claim:
1. A caster sleeve for insertion into a cavity in a furniture leg and for receiving a caster pintle, said sleeve being of tubular form and including a closed upper end and a downwardly extending skirt, the skirt being slitted longitudinally to form legs disposed in opposed relation, the legs being resilient to a degree enabling movements thereof toward and from each other, the legs including detents at points spaced below the upper end and positioned for releasably retaining the head of a caster pintle between the detents and the upper end, the upper end of the sleeve being provided with a downwardly extending projection of rounded character constituting a single pivot point engageable with the upper end of a caster pintle for transmitting the weight of a furniture leg to the pintle, the legs being provided at their lower ends with outwardly extending flanges adapted to engage the lower end of a furniture leg for transmitting the weight of the latter to the sleeve, and the legs including tongues at locations between the detents and the flanges, said tongues extending generally upwardly and having lower ends integrally joined with the legs and upper ends terminating in pointed extremities disposed adjacent the outer surfaces of the legs, the tongues being so shaped and arranged that upon a caster pintle being driven into the sleeve past the detents, said pointed extremities of the tongues are forced outwardly into the material of the furniture leg.

2. A caster sleeve according to claim 1 wherein the sleeve is of integral construction and formed from a single piece of sheet material.

References Cited in the file of this patent
UNITED STATES PATENTS

| | | |
|---|---|---|
| 761,447 | Kempshall | May 31, 1904 |
| 1,069,692 | Onderdonk | Aug. 12, 1913 |
| 1,778,285 | Noelting | Oct. 14, 1930 |
| 2,117,436 | Herold | May 17, 1938 |
| 2,452,388 | Stevens | Oct. 26, 1948 |
| 2,689,411 | Slopa | Sept. 21, 1954 |
| 2,707,794 | Gruber | May 10, 1955 |
| 2,794,994 | Herold | June 11, 1957 |
| 2,846,710 | Herold | Aug. 12, 1958 |

FOREIGN PATENTS

| | | |
|---|---|---|
| 974,726 | France | Feb. 22, 1951 | apart and drives the pointed extremities 48 into the wood of the furniture leg, to substantially the position shown in FIG. 6. The lateral extension of the pointed extremities 48 serves to direct them into the wood in a generally outward direction, although they extend outwardly and downwardly and penetrate or bite into the wood in such direction as to render the sleeve impossible of removal short of injury to the sleeve or the furniture leg.

Further driving the caster pintle into the sleeve causes the head 34 to pass between and beyond the detents 40 to a position shown in dot-dash lines in FIG. 6. The detents, as mentioned above, are spaced apart a distance slightly less than the diameter of the head 34 and spring apart to enable the head 34 to pass therebetween. Once the head is above the detents, the detents retain the caster in place under the effect of normal forces encountered, such as in handling the furniture, but the caster may be removed by applying substantially greater external force thereto, as by pulling the caster by the hand or using a suitable tool. The resilience of the detents 40 in spreading apart to permit the head 34 to pass therebetween may be provided by the outward springing motions of the lower end of the legs 22, or of flexibility of the material of the legs at any portion between the upper and lower ends. The extent of movement apart of the detent 40, as will be understood, is very slight. The diameter of the cavity or recess 14 of the furniture leg is essentially the same as the outside diameter of the sleeve, but it will be understood that the normal variations or imperfections in the dimensions of the sleeve, and irregularities in the surface of the cavity, permit sufficient flexing of the material of the legs 22 to enable the detents 40 to spread to permit the head 34 to move therebetween.

The support of the furniture leg is transmitted to the pintle solely through the upper end thereof, as stated, and the lower end of the sleeve is spaced above the connecting elements between the pintle and the fork 28. The rounded hemi-spherical formation of the projection 24 in cooperating with the relatively flat upper end surface of the head 34 of the pintle forms essentially a point contact with the pintle and as a result swivelling motion of the pintle, relative to the sleeve, is aided. As a consequence, the caster is enabled to swivel freely about the axis of the pintle in the castering movements.

The smooth upper surface of the flanges 50 enables the sleeve to be used with a furniture leg of relatively small dimensions, compared with most known and older types of corresponding devices, such as members provided with teeth for biting into the lower end surface of the furniture leg. The lower ends of the legs 22 of the sleeve are enabled to move laterally toward and from each other when in position in the furniture leg, without adversely affecting any of the elements of the sleeve and associated members, or affecting the holding function of the sleeve. More particularly the relative movement of the legs 22 toward and from each other does not in any way affect the holding function of the tongues 42. Moreover, the shank 32 of the pintle operates to prevent the tongues from withdrawing from the wood of the furniture leg as will be seen from the relative positions of these elements in FIG. 6.

The sleeve being made of a single integral piece works for extreme simplicity and consequent low cost both in materials and in methods of manufacture.

While I have shown herein a certain preferred embodiment of the invention, it will be understood that changes may be made therein within the scope of the appended claims.

I claim:

1. In combination, a caster sleeve and a caster, the caster including a pintle having an enlarged head and the pintle being adapted for insertion in the sleeve, the sleeve being made of a single integral stamping of generally tubular form and having a closed upper end and downwardly and longitudinally extending legs, said upper end having a downwardly extending spherical projection for engagement with the upper end of the pintle when inserted in the sleeve, said legs each being generally semi-cylindrical and having their hollow sides facing each other and defining slits extending from adjacent the closed upper end to and through the lower end whereby the legs are separate and the lower ends thereof are capable of moving toward and from each other, said legs having a normal position in which they diverge downwardly at least slightly and the lower ends thereof are spaced apart at least slightly, said legs having adjacent their upper ends inwardly extending detents for releasably retaining the head of the pintle when the latter is inserted in the sleeve, said legs having opposed downwardly extending tongues struck therefrom, the tongues having pointed free ends extending generally laterally outwardly with their pointed extremities closely adjacent the outer surfaces of the legs, and the tongues having generally inwardly directed butt portions projecting inwardly beyond the inner surfaces of the legs adapted to be driven generally outwardly, the head of the pintle being of a diameter greater than the space between the butt portions and operative for driving the pointed extremities into the material of a furniture leg in which the sleeve is inserted, in response to passage of the head between the butt portions, said legs having outwardly extending flanges at their lower ends for engagement with and supporting the furniture leg in which it is inserted, said flanges having smooth upper surfaces whereby to enable lateral sliding movement of the flanges relative to the furniture leg while in friction engagement therewith.

2. The invention set out in claim 1 in combination with a furniture leg having a cavity receiving the sleeve which is of such diameter that the sleeve is slightly compressed at the lower end relative to its said normal position.

References Cited in the file of this patent

UNITED STATES PATENTS

| | | |
|---|---|---|
| 436,308 | Diss | Sept. 9, 1890 |
| 652,426 | Clark | June 26, 1900 |
| 855,403 | Howe | May 28, 1907 |
| 1,426,494 | Noelting | Aug. 22, 1922 |
| 1,466,531 | Johnson | Aug. 28, 1923 |
| 1,649,528 | Herold | Nov. 25, 1927 |
| 1,912,795 | Rice | June 6, 1933 |